United States Patent
Dietrich et al.

(10) Patent No.: US 12,222,027 B2
(45) Date of Patent: Feb. 11, 2025

(54) METHOD FOR PRODUCING A DIFFERENTIAL HOUSING AND DIFFERENTIAL HOUSING

(71) Applicant: MAGNA Powertrain GmbH & Co KG, Lannach (AT)

(72) Inventors: Alexander Dietrich, Ehrenhausen (AT); Tobias Koblmiller, Graz (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 0 days.

(21) Appl. No.: 18/084,626

(22) Filed: Dec. 20, 2022

(65) Prior Publication Data

US 2023/0213093 A1 Jul. 6, 2023

(30) Foreign Application Priority Data

Jan. 3, 2022 (DE) ...................... 10 2022 200 009.9

(51) Int. Cl.
*F16H 48/40* (2012.01)
*B23P 15/14* (2006.01)
*F16H 48/38* (2012.01)

(52) U.S. Cl.
CPC .............. *F16H 48/40* (2013.01); *B23P 15/14* (2013.01); *F16H 2048/382* (2013.01)

(58) Field of Classification Search
CPC .............. F16H 48/40; F16H 2048/382; F16H 2048/385; F16H 48/38; B23P 15/14; B23P 15/00; B22D 25/00; C21D 1/10; C21D 1/18; C21D 9/0068
See application file for complete search history.

(56) References Cited

U.S. PATENT DOCUMENTS

| | | | | |
|---|---|---|---|---|
| 2001/0039228 A1* | 11/2001 | Eulenstein | .............. | F16H 48/08 74/424 |
| 2004/0134307 A1* | 7/2004 | Pascoe | .................... | F16H 48/08 74/650 |

FOREIGN PATENT DOCUMENTS

| | | | |
|---|---|---|---|
| BR | PI0707301 A2 * | 5/2011 | |
| EP | 1963717 B1 | 2/2010 | |
| JP | H09229162 A | 9/1997 | |
| JP | 2008223126 A | 9/2008 | |
| WO | WO-2020201987 A1 * | 10/2020 | ................ B23F 5/22 |

* cited by examiner

*Primary Examiner* — Rick K Chang
(74) *Attorney, Agent, or Firm* — Dickinson Wright PLLC

(57) ABSTRACT

The invention relates to a method for producing a differential housing having at least one machined bearing body and a machined gearing. In order to improve the differential housing in terms of production technology and/or function, the differential housing which has the bearing body is cast from a nodular cast iron material before the differential housing which has the bearing body and the gearing is machined.

17 Claims, 3 Drawing Sheets

METHOD FOR PRODUCING A DIFFERENTIAL HOUSING AND DIFFERENTIAL HOUSING

CROSS-REFERENCE TO RELATED APPLICATIONS

This application claims priority to German Patent Application No. DE 10 2022 200 009.9, filed on Jan. 3, 2022, and which is hereby incorporated by reference in its entirety.

FIELD OF THE INVENTION

The invention relates generally to a method for producing a differential housing which has at least one machined bearing body and a machined gearing. The invention further relates to such a differential housing.

BACKGROUND OF THE INVENTION

This section provides information related to the present disclosure which is not necessarily prior art.

A method for producing a gearwheel from cast iron with nodular graphite is disclosed in the Japanese published patent application JP 2008223126 A, wherein the ductile cast iron material is machined and subsequently heat-treated. A differential housing is disclosed in the European patent application EP 1 963 717 B1, comprising a housing bell, a housing cover and a drive gearwheel, wherein the housing bell and the housing cover are connected together by means of a riveted connection produced by a plurality of rivets, wherein the rivets of the riveted connection are integrally formed on the housing cover or on the housing bell and wherein the drive gearwheel is fastened by means of the integrally formed rivets, fixedly in terms of rotation between the housing cover and the housing bell.

SUMMARY OF THE INVENTION

This section provides a general summary of the invention, and is not a comprehensive disclosure of its full scope or all of its features.

It is the object of the invention to improve a differential housing in terms of production technology and/or function, the differential housing having at least one machined bearing body and a machined gearing.

The object is achieved in a method for producing a differential housing, which has at least one machined bearing body and a machined gearing, by the differential housing which has the bearing body and the gearing being cast from a nodular cast iron material before the differential housing which has the bearing body and the gearing is machined. The gearing is preferably a spur gearing. The differential housing can be designed in the same manner as, or in a similar manner to, a conventional differential housing. An essential point is that the individual parts of the differential housing, i.e. the bearing body or the bearing bodies, the gearing and, for example, a bell in the differential housing, which is cast from the nodular cast iron material, are integrally connected together. The production of a complex geometry of the differential housing is simplified by the design of the differential housing as a cast part. Moreover, the nodular cast iron material which is used has a noise damping effect during the operation of the differential housing. The nodular cast iron material is a cast iron material which contains nodular graphite. For producing the differential housing, preferably a nodular cast iron material which has the abbreviation GJS 700, GJS 800 or GJS 900 is used.

The cast differential housing is machined, in particular soft-turned and washed. The cast unmachined part is initially relatively soft and is also denoted as a green part. Similarly, a machining of the unmachined part by turning is also denoted as soft turning. When washed, the chips produced during the machining are removed.

In a pre-machining process, the gearing is generated by removing material, for example by gear milling. The pre-machining takes place both in a root region and in a flank region of the gearing. The pre-machining of the green part, and in particular of the gearing, ends with the gear milling, substantially after the soft turning and washing.

In three different variants of the method, the root region of the gearing is already completed in the pre-machining process. In the pre-machining process, the flank region is generated with an oversize which is subsequently removed in a post-machining process. The completion of the root region of the gearing in the pre-machining process provides advantages in terms of strength, in particular during a post-machining of the gearing in the root region, for example by hardening, in particular dual frequency hardening, and/or in a shot peening operation.

In a fourth variant of the method, the root region of the gearing is also pre-machined with an oversize in the pre-machining process. In this fourth variant, the oversize in the root region and in the flank region of the gearing is removed before the differential housing is completed.

The gearing is advantageously inductively hardened. The gearing is preferably hardened both in the root region and in the flank region. The hardening of the gearing preferably takes place by dual frequency hardening. The dual frequency hardening is also denoted by the abbreviation SDF, wherein the capital letters SDF represent the English terms "Simultaneous Dual Frequency Hardening". The dual frequency hardening of the gearing is preferably carried out in all four variants of the claimed method.

The hardened gearing is advantageously subjected to a blasting operation. During the blasting operation, the focus is directed toward the root region of the gearing. The blasting operation is also denoted as shot peening, since the load-bearing capacity of the gearing is increased by the blasting operation.

The gearing is post-machined after the hardening and/or after the blasting operation. In this case, in the first three variants of the claimed method the post-machining of the gearing is advantageously carried out only in the flank region and not in the root region. In the fourth variant, the post-machining is carried out both in the flank region and in the root region of the gearing. The post-machining, which is also denoted as hard machining and/or fine machining, preferably comprises gear grinding and/or honing.

The post-machined gearing is advantageously subjected to a blasting operation. In the post-machining process, advantageously both the root region and the flank region of the gearing are subjected to the blasting operation. The load-bearing capacity of the tooth flank region and the tooth root region can be effectively increased by the blasting operation after the hardening and after the post-machining.

The object specified above is also achieved by a differential housing which has at least one machined bearing body and a machined gearing, and which is produced according to an above-described method.

Further areas of applicability will become apparent from the description provided herein. The description and specific examples in this summary are intended for purposes of illustration only and are not intended to limit the scope of the present disclosure.

DRAWINGS

The drawing described herein are for illustrative purposes only of selected embodiments and not all possible implementations and are not intended to limit the scope of the present disclosure.

DETAILED DESCRIPTION OF THE INVENTION

Figure 1:
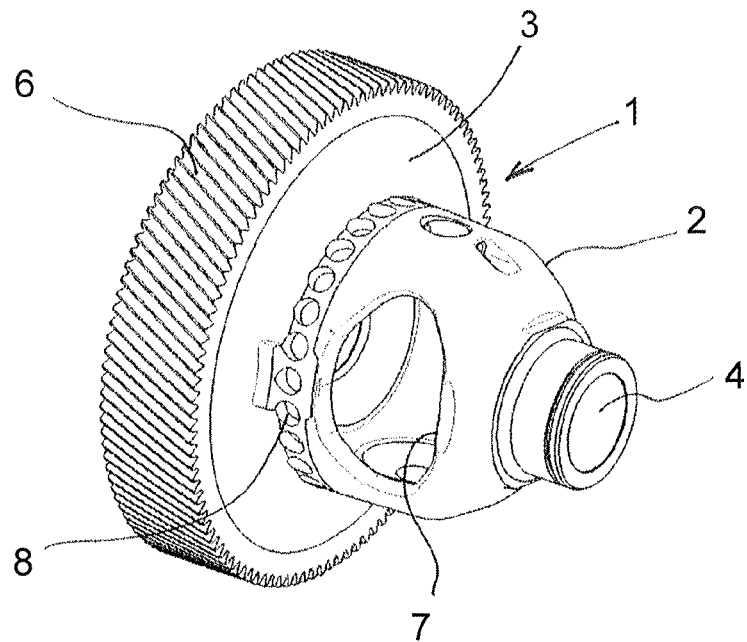
FIG. 1 shows a perspective view of a differential housing which is made from a nodular cast iron material and which has two machined bearing bodies and a machined gearing.
Figure 2:
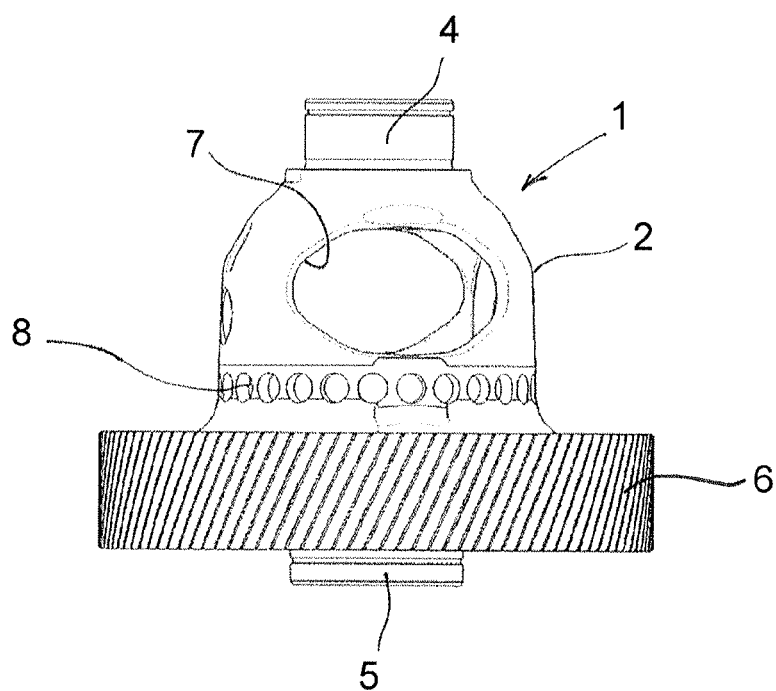
FIG. 2 shows the differential housing of FIG. 1 in a plan view.

A differential housing 1 which has a bell body 2, a wheel body 3 and two bearing bodies 4, 5 is shown in different views in FIG. 1 and FIG. 2. The differential housing 1 is designed as a cast part from a nodular cast iron material. Preferably, the casting material used is a nodular cast iron material which has the abbreviation GJS 700 or GJS 800.

A gearing 6, which is designed as a spur gearing and is machined, is configured to extend radially outwardly on the wheel body 3. The bell body comprises a recesses 7 for passing through shafts, not shown. The bell body 2 also comprises a plurality of balancing bores 8.

The production costs can be reduced by designing the differential housing 1 as a cast part. By combining a green machining of the gearing, a dual frequency hardening and a blasting treatment, which can be carried out optionally before or after a gear grinding, the casting material which is more cost-effective but inferior regarding the operational stability can be used as a material for running gears subjected to high stress. Moreover, the noise damping can be effectively improved by the nodular cast iron material, during the operation of the differential housing 1.

By the variants described hereinafter, relative to service life or fatigue, the differential housing 1 which is made of the nodular cast iron material can replace a conventional differential housing which has a gearwheel made of a case-hardened steel or heat-treated steel. In addition to cost savings and NVH optimization, the weight of the differential housing 1 can be reduced. In this case, a high requirement for the casting quality, a more elaborate green machining before the hardening, in particular before a surface hardening, are taken into account. Moreover, additional measures for increasing strength, such as for example shot peening, are carried out for increasing the flank load-bearing capacity or the tooth root load-bearing capacity.

Figure 3:
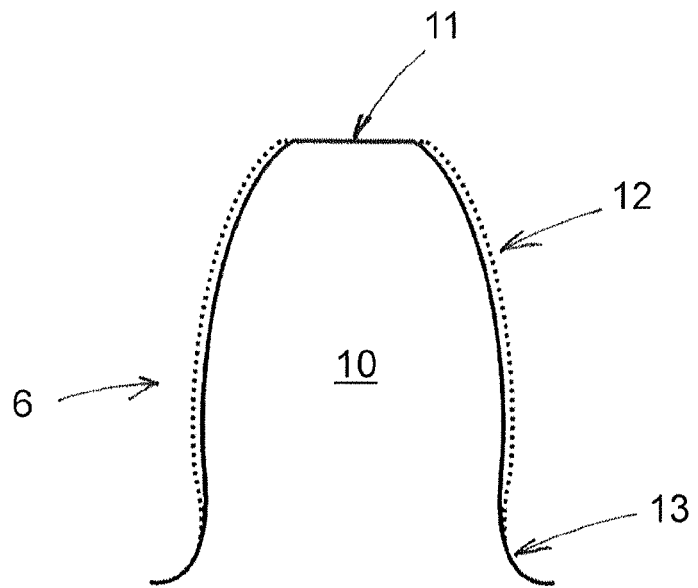
FIG. 3 shows a schematic sectional view of a tooth of the gearing of the differential housing with an oversize in a tooth flank region.
Figure 4:
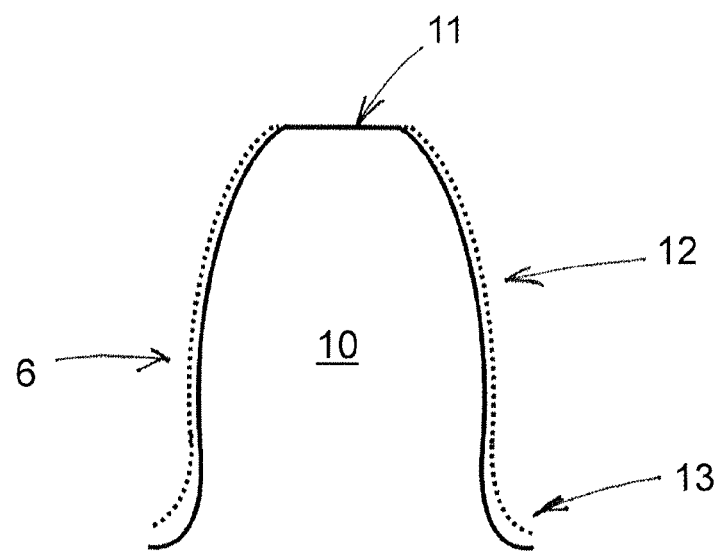
FIG. 4 shows a similar view to FIG. 3 with an oversize both in the tooth flank region and in a tooth root region.

A tooth 10 of the gearing 6 of the differential housing of FIG. 1 and FIG. 2 is shown schematically in section in FIG. 3 and FIG. 4. The tooth 10 has a tip region 11, a flank region 12 and a root region 13. An oversize, which is removed during the machining of the tooth 10, is indicated by dotted lines in FIG. 3 and FIG. 4. In the tooth 10 shown in FIG. 3, the oversize is only provided in the flank region 12. In the tooth 10 shown in FIG. 4, the oversize is provided both in the flank region 12 and in the root region 13.

The tooth 10 in FIG. 3 relates to a first, a second and a third variant of the claimed method. The tooth 10 in FIG. 4 relates to a fourth variant of the claimed method.

Figure 5:
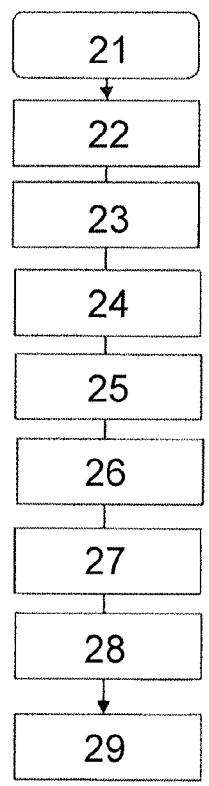
FIG. 5 shows a flow diagram of a method for producing the differential housing of FIGS. 1 and 2 according to a first variant.
Figure 6:
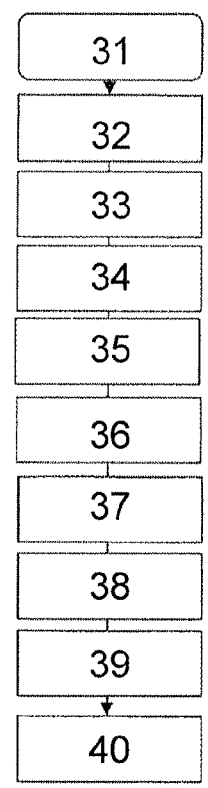
FIG. 6 shows a similar view to FIG. 5 for illustrating three further variants of the method for producing the differential housing.

In FIG. 5 and FIG. 6, two flow charts of a total of the four variants of the claimed method are shown. FIG. 5 comprises a total of nine method steps 21 to 29. FIG. 6 comprises a total of ten method steps 31 to 40.

The method steps 21; 31 represent casting an unmachined part of the differential housing from the nodular cast iron material. The method steps 22; 32 represent soft turning the cast unmachined part. The method steps 23; 33 represent washing the soft-turned cast part. The method steps 24; 34 represent gear milling the gearing. The method steps 25; 35 represent dual frequency hardening.

The method steps 27; 38 represent balancing the differential housing. The method steps 28; 39 represent washing the differential housing. The method steps 29; 40 represent mounting the differential housing.

FIG. 5 relates to the first variant of the claimed method. The gearing is already completed in the tooth root region in a pre-machining process during the gear milling 34. After the inductive hardening 26, in the method step 27 in a post-machining process the oversize in the flank region of the gearing is removed by gear grinding or honing.

By producing the tooth root region to the finished size in the soft machining process, the inductively hardened layer in the tooth root region is advantageously not reduced by the hard finishing, in particular, by gear grinding and/or honing, in the method step 26.

In variants two and three of the claimed method, a root region which has a tooth root radius is also already completed in the pre-machining process in step 34 by gear milling. In variants two and three, the gearing is subsequently hardened, and namely inductively, primarily by dual frequency hardening in the method step 35.

In the second variant of the method, a blasting operation is carried out by shot peening in the method step 36. During the blasting of the gearing, the focus is directed toward the tooth root region. Subsequently in the method step 37 only the tooth flank region is post-machined. The post-machining is also denoted as hard finishing. In this case, the tooth flank region of the gearing is machined by gear grinding or honing. The tooth root region is not machined during the post-machining process.

By producing the tooth root region to the finished size in the soft machining process, the inductively hardened edge layer in the tooth root is not reduced by the hard finishing. Due to the shot peening after hardening and before the hard finishing, such as grinding or honing, in combination with a tooth root which has already been machined to the finished size in the soft machining process, the end result is a fine-machined flank and a tooth root which has been blasted in order to increase the operational stability.

In the third variant of the method, the hard finishing or post-machining of the tooth flank region is carried out in the method step 36 without the tooth root after the hardening in step 35. The tooth root region in this case is not post-machined. After the post-machining in step 36 the gearing is subjected to a blasting operation in step 37, in particular by shot peening of the gearing, wherein the focus is directed both toward the flank region and toward the tooth root region.

By producing the tooth root in the soft machining process to the finished size, the inductively hardened layer in the tooth root is not reduced by the hard finishing. The load-bearing capacity of the tooth flank and tooth root is correspondingly increased by the shot peening after the hardening and the hard finishing, by grinding or honing.

In the fourth variant of the claimed method, the tooth root region of the gearing is produced with an oversize for a subsequent gear grinding/gear honing, as indicated in FIG. 4. In the method step 35 the gearing is inductively hardened, in particular by dual frequency hardening. In the method step 36, the hard finishing of the gearing is carried out by gear grinding or honing, wherein both the tooth flank region and the tooth root region are hard-finished. In the method step 37 the gearing is blasted in the finished state.

The flank load-bearing capacity and the tooth root strength are increased by the shot peening after the hardening and the hard finishing by grinding or honing. The tooth root, which has been ground, exhibits advantages by the reduced roughness and surface oxidation.

What is claimed is:

1. A method for producing a differential housing having at least one machined bearing body and a machined gearing, the method comprising:
   casting the differential housing from a nodular cast iron material; and
   after casting the differential housing, machining the at least one bearing body and the gearing; and
   pre-machining a root region and a flank region of the gearing in a pre-machining process.

2. The method according to claim 1, further including soft-turning and washing the cast differential housing.

3. The method according to claim 1, further including completing machining of the root region of the gearing in the pre-machining process.

4. The method according to claim 1, further including pre-machining the root region and the flank region of the gearing with an oversize.

5. The method according to claim 1, further including inductively hardening the gearing.

6. The method according to claim 5, further including blasting the hardened gearing in a blasting operation.

7. The method according to claim 1, further including post-machining the gearing in the flank region but not in the root region.

8. The method according to claim 7, further including blasting the post-machined gearing in a blasting operation.

9. A differential housing having at least one machined bearing body and a machined gearing produced according to the method of claim 1.

10. A differential housing having at least one machined bearing body and a machined gearing produced according to a method, the method comprising:
   casting the differential housing from a nodular cast iron material; and
   after casting the differential housing, machining the at least one bearing body and the gearing;
   wherein a root region and a flank region of the gearing are pre-machined in a pre-machining process.

11. The differential housing according to claim 10, wherein the cast differential housing is soft-turned and washed.

12. The differential housing according to claim 10, wherein the root region of the gearing is completed in the pre-machining process.

13. The differential housing according to claim 10, wherein the root region and the flank region of the gearing are pre-machined with an oversize.

14. The differential housing according to claim 10, wherein the gearing is inductively hardened.

15. The differential housing according to claim 14, wherein the hardened gearing is subjected to a blasting operation.

16. The differential housing according to claim 10, wherein the gearing is post-machined in the flank region but not in the root region.

17. The differential housing according to claim 16, wherein the post-machined gearing is subjected to a blasting operation.

* * * * *